United States Patent
Mori et al.

(10) Patent No.: US 9,905,822 B2
(45) Date of Patent: Feb. 27, 2018

(54) ENERGY STORAGE UNIT

(71) Applicant: GS Yuasa International Ltd., Kyoto-shi (JP)

(72) Inventors: Sumio Mori, Kyoto (JP); Tomonori Kako, Kyoto (JP); Akihiko Miyazaki, Kyoto (JP); Kenta Nakai, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 363 days.

(21) Appl. No.: 14/094,202

(22) Filed: Dec. 2, 2013

(65) Prior Publication Data
US 2014/0154559 A1 Jun. 5, 2014

(30) Foreign Application Priority Data
Dec. 4, 2012 (JP) ................. 2012-265699

(51) Int. Cl.
H01M 2/10 (2006.01)
H01M 2/20 (2006.01)
H01M 2/30 (2006.01)

(52) U.S. Cl.
CPC ....... *H01M 2/1077* (2013.01); *H01M 2/1094* (2013.01); *H01M 2/206* (2013.01); *H01M 2/305* (2013.01); *H01M 2220/20* (2013.01)

(58) Field of Classification Search
CPC ........... H01M 2220/20; H01M 2/1077; H01M 2/1094; H01M 2/206; H01M 2/305
USPC ....................................................... 429/159
See application file for complete search history.

(56) References Cited

U.S. PATENT DOCUMENTS

| 5,849,431 A | * 12/1998 | Kita | .................... H01M 2/0202 |
| | | | 429/164 |
| 7,935,438 B2 | 5/2011 | Kim | |
| 8,465,867 B2 | 6/2013 | Kim | |
| 9,412,989 B2 | 8/2016 | Kinoshita et al. | |

(Continued)

FOREIGN PATENT DOCUMENTS

| JP | H 06-243849 A | 9/1994 |
| JP | 2005-322647 A | 11/2005 |

(Continued)

*Primary Examiner* — Jonathan Jelsma
*Assistant Examiner* — Rashid Alam
(74) *Attorney, Agent, or Firm* — McGinn IP Law Group, PLLC.

(57) ABSTRACT

An energy storage unit having plural energy storage devices, each of which includes a container housing an electrode assembly and positive and negative electrode terminals electrically connected to the electrode assembly and extending from the container in the same direction, includes: a bus bar electrically connecting a first terminal, which is one of the positive electrode terminal and the negative electrode terminal of a first energy storage device included in the plural energy storage devices, and a second terminal, which is one of the positive electrode terminal and the negative electrode terminal of a second energy storage device included in the plural energy storage devices and opposite in polarity to the first terminal; a packing member interposed between the first terminal and the container of the first energy storage device; and an insulating member interposed between the bus bar and the container of the first energy storage device.

18 Claims, 9 Drawing Sheets

(56) References Cited

U.S. PATENT DOCUMENTS

| | | | |
|---|---|---|---|
| 2005/0250006 A1* | 11/2005 | Kim | H01M 2/18 |
| | | | 429/160 |
| 2010/0081048 A1 | 4/2010 | Nansaka et al. | |
| 2011/0064993 A1 | 3/2011 | Ochi | |
| 2011/0104556 A1* | 5/2011 | Kim | H01M 2/1077 |
| | | | 429/160 |
| 2011/0177382 A1 | 7/2011 | Kim | |
| 2011/0200865 A1* | 8/2011 | Byun et al. | 429/156 |
| 2011/0244282 A1 | 10/2011 | Seto et al. | |
| 2011/0287299 A1* | 11/2011 | Kim | H01M 2/1077 |
| | | | 429/158 |
| 2011/0305936 A1* | 12/2011 | Kwag et al. | 429/121 |
| 2012/0129022 A1* | 5/2012 | Kalish et al. | 429/72 |
| 2012/0156548 A1* | 6/2012 | Kim | H01M 2/0237 |
| | | | 429/158 |
| 2013/0202928 A1* | 8/2013 | Beulque | H01M 10/425 |
| | | | 429/90 |
| 2013/0309553 A1 | 11/2013 | Kinoshita et al. | |

FOREIGN PATENT DOCUMENTS

| | | |
|---|---|---|
| JP | 2007-335143 A | 12/2007 |
| JP | 2010-80355 A | 4/2010 |
| JP | 2010-080355 A | 4/2010 |
| JP | 2011-060623 A | 3/2011 |
| JP | 2011-216400 A | 10/2011 |
| JP | 2012-169256 A | 9/2012 |
| JP | 2012-216360 A | 11/2012 |

\* cited by examiner

ENERGY STORAGE UNIT

CROSS-REFERENCE TO RELATED APPLICATION

The present application is based on and claims priority of Japanese Patent Application No. 2012-265699 filed on Dec. 4, 2012. The entire disclosure of the above-identified application, including the specification, drawings, and claims is incorporated herein by reference in its entirety.

FIELD

The present invention relates to an energy storage unit including a plurality of energy storage devices.

BACKGROUND

Vehicles which employ an electric motor as a power source, such as hybrid and electric vehicles, are gaining popularity as a substitute for conventional gasoline engine vehicles in light of global environmental issue.

Moreover, energy storage units which include a plurality of energy storage devices such as lithium ion secondary energy storage devices are widely used as energy sources for supplying power to the electric motors in these hybrid vehicles.

With this kind of energy storage unit, a plurality of energy storage devices, which are electrically connected by bus bars provided between neighboring energy storage devices, are arranged in a covering member made of a rigid metal.

Patent Literature 1 (Japanese Unexamined Patent Application Publication No. 2011-216400) discloses a technique to prevent electrical shorting between the bus bar and the metal covering member in this kind of energy storage unit.

SUMMARY

The present invention aims to provide an energy storage unit which includes a plurality of energy storage devices and is capable of a bus bar and the container of an energy storage device from electrically shorting in an abnormal state.

In order to achieve the above goal, the energy storage unit according to an aspect of the present invention is provided with a plurality of energy storage devices, each of which includes (i) a container which houses an electrode assembly and (ii) a positive electrode terminal and a negative electrode terminal which are electrically connected to the electrode assembly and extend from the container in a same direction, the energy storage unit including: a bus bar which electrically connects a first terminal and a second terminal, the first terminal being one of the positive electrode terminal and the negative electrode terminal of a first energy storage device included in the plurality of energy storage devices, the second terminal being one of the positive electrode terminal and the negative electrode terminal of a second energy storage device included in the plurality of energy storage devices and opposite in polarity to the first terminal; a first insulating member interposed between the first terminal and the container of the first energy storage device; and a second insulating member interposed between the bus bar and the container of the first energy storage device.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENT

A bus bar is a plate or bar shaped conductor made of metal uncoated with an insulation coating. The containers of the energy storage devices are also generally made of metal. Moreover, at least one of the positive electrode terminal and the negative electrode terminal of an energy storage device attached to the container is electrically insulated from the container.

As such, in the energy storage unit, each bus bar is arranged so as not to come in contact with the containers of the energy storage devices. However, as the bus bars are connected to the electrode terminals of energy storage devices, they are positioned relatively close to the containers of the energy storage devices.

Additionally, due to the demand for compact energy storage units, it is not feasible to increase the distance between the bus bars and the containers of the energy storage devices.

As such, if the energy storage unit were put in an abnormal state, such as a state in which the energy storage unit is deformed from a strong impact, it is conceivable that a bus bar could come into contact with the container of an energy storage device. In other words, it is possible that an electrical short could occur between a bus bar and the container of an energy storage device. However, with the above conventional technique, it is not possible to keep a bus bar and the container of an energy storage device from electrically shorting in an abnormal state.

In light of the above conventional problem, the present invention aims to provide an energy storage unit which includes a plurality of energy storage devices and is capable of keeping a bus bar and the container of an energy storage device from electrically shorting in an abnormal state.

In order to achieve the above goal, the energy storage unit according to an aspect of the present invention is provided with a plurality of energy storage devices, each of which includes (i) a container which houses an electrode assembly and (ii) a positive electrode terminal and a negative electrode terminal which are electrically connected to the electrode assembly and extend from the container in a same direction, the energy storage unit including: a bus bar which electrically connects a first terminal and a second terminal, the first terminal being one of the positive electrode terminal and the negative electrode terminal of a first energy storage device included in the plurality of energy storage devices, the second terminal being one of the positive electrode terminal and the negative electrode terminal of a second energy storage device included in the plurality of energy storage devices and opposite in polarity to the first terminal; a first insulating member interposed between the first terminal and the container of the first energy storage device; and a second insulating member interposed between the bus bar and the container of the first energy storage device.

With this, the second insulating member is provided between a container of an energy storage device and a bus bar that is connected to the first terminal insulated from the container—that is to say, a bus bar that is designed to be electrically insulated from the container.

As such, even if the energy storage unit were to deform and the bus bar and the container were to become closer than normal, the second insulating member reduces the probability of the bus bar and the container contacting.

In other words, with the energy storage unit according to the embodiment, a bus bar and the container of an energy storage device can be kept from electrically shorting in an abnormal state.

Moreover, in the energy storage unit according to an aspect of the present invention, when viewing the first energy storage device from a side on which the bus bar is provided, the second insulating member may cover at least an area in which the bus bar and a surface of the container of the first energy storage device from which the first terminal extends overlap.

With this, electrical shorting between a bus bar and the container of an energy storage device can be prevented with greater reliability.

Moreover, in the energy storage unit according to an aspect of the present invention, the second insulating member may be provided with two holes and interposed between (i) the bus bar and (ii) the container of the first energy storage device and the container of the second energy storage device, and the bus bar may be electrically connected to the first terminal and the second terminal through the two holes provided in the second insulating member.

Moreover, in the energy storage unit according to an aspect of the present invention, the second insulating member may be provided with two holes, the first terminal may be electrically connected to the bus bar through a first of the two holes, and one of the positive electrode terminal and the negative electrode terminal of the first energy storage device that is opposite in polarity to the first terminal may be electrically connected to a different bus bar through a second of the two holes.

In this way, by providing the second insulating member to correspond to a plurality of electrode terminals, it is possible, for example, to more reliably ensure insulation in the area surrounding a plurality of electrode terminals between a bus bar and the container of an energy storage device with a single member (the second insulating member). Moreover, from the standpoint of, for example, production efficiency of the energy storage unit, this is more advantageous than providing a separate second insulating member for each electrode terminal.

Moreover, in the energy storage unit according to an aspect of the present invention, the second insulating member may include, layered in a thickness direction, a resin layer including a resin and a ceramic layer including a ceramic.

With this, it is possible to, for example, increase the flexibility and strength of the second insulating member. As a result, even if, for example, the second insulating member were to become firmly stuck between the bus bar and the container of an energy storage device, since the second insulating member is resistant to breaking, the insulating function of the second insulating member would be maintained.

Moreover, in the energy storage unit according to an aspect of the present invention, the first insulating member and the second insulating member may be integrated as a single member.

With this, it is possible, for example, for a packing member interposed between the first terminal and the container to serve the functions of the first insulating member and the second insulating member. From the standpoint of, for example, production efficiency of the energy storage unit, this is more advantageous than providing the first insulating member and the second insulating member as separate members in the energy storage unit.

Moreover, the energy storage unit according to an aspect of the present invention may be an energy storage unit provided with a plurality of energy storage devices, each of which includes (i) a container which houses an electrode assembly and (ii) a positive electrode terminal and a negative electrode terminal which are electrically connected to the electrode assembly and extend from the container in a same direction, the energy storage unit including: a bus bar which electrically connects a first terminal and a second terminal, the first terminal being one of the positive electrode terminal and the negative electrode terminal of a first energy storage device included in the plurality of energy storage devices, the second terminal being one of the positive electrode terminal and the negative electrode terminal of a second energy storage device included in the plurality of energy storage devices and opposite in polarity to the first terminal; and an insulating member for electrically insulating the bus bar from the container of the first energy storage device, the container of the first energy storage device being electrically insulated from the first terminal.

With this, since the insulating member is provided between the container and a bus bar designed to be insulated from the container, electrical shorting between the bus bar and the container of an energy storage device in an abnormal state can be prevented.

Hereinafter, the energy storage unit according to the embodiment of the present invention is described with reference to the Drawings. It should be noted that each of the drawings is a schematic representation, and as such, is not necessarily an exact representation.

The exemplary embodiment described below shows one specific example of the present invention. The numerical values, shapes, materials, structural elements, and the arrangement and connection of the structural elements etc. shown in the following exemplary embodiment are mere examples, and therefore do not limit the scope of the appended Claims and their equivalents. Moreover, among the structural elements in the following exemplary embodiment, structural elements not recited in any one of the independent claims defining the most generic part of the inventive concept are described as arbitrary structural elements.

(Structural Design of the Energy Storage Unit)

First, using FIG. 1 and FIG. 2, the structural design of the energy storage unit 1 according to the embodiment will be described.

Figure 1:
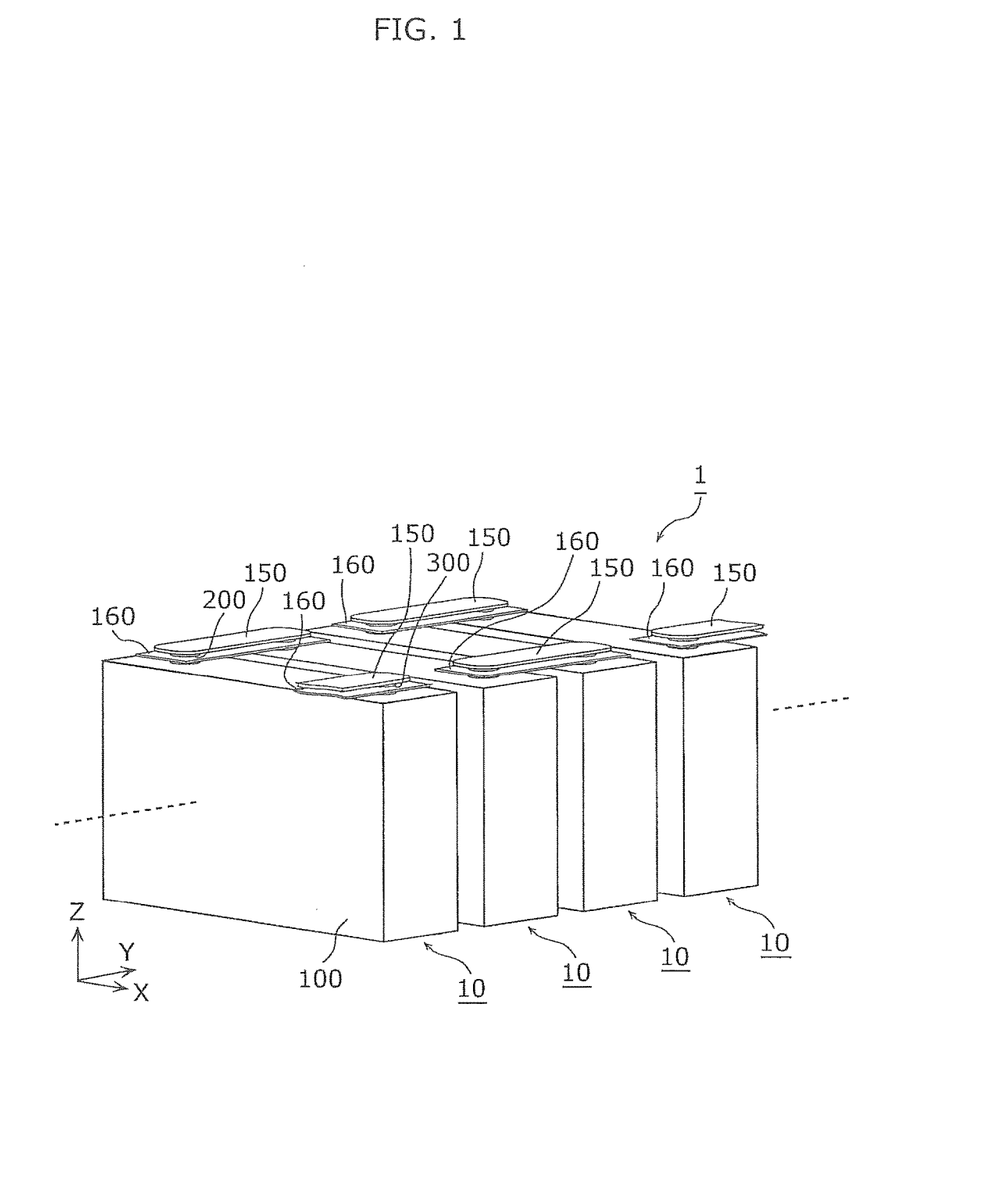
FIG. 1 is a perspective view showing the structural design of the energy storage unit according to the embodiment.

FIG. 1 is a perspective view showing the structural design of the energy storage unit 1 according to the embodiment.

Figure 2:
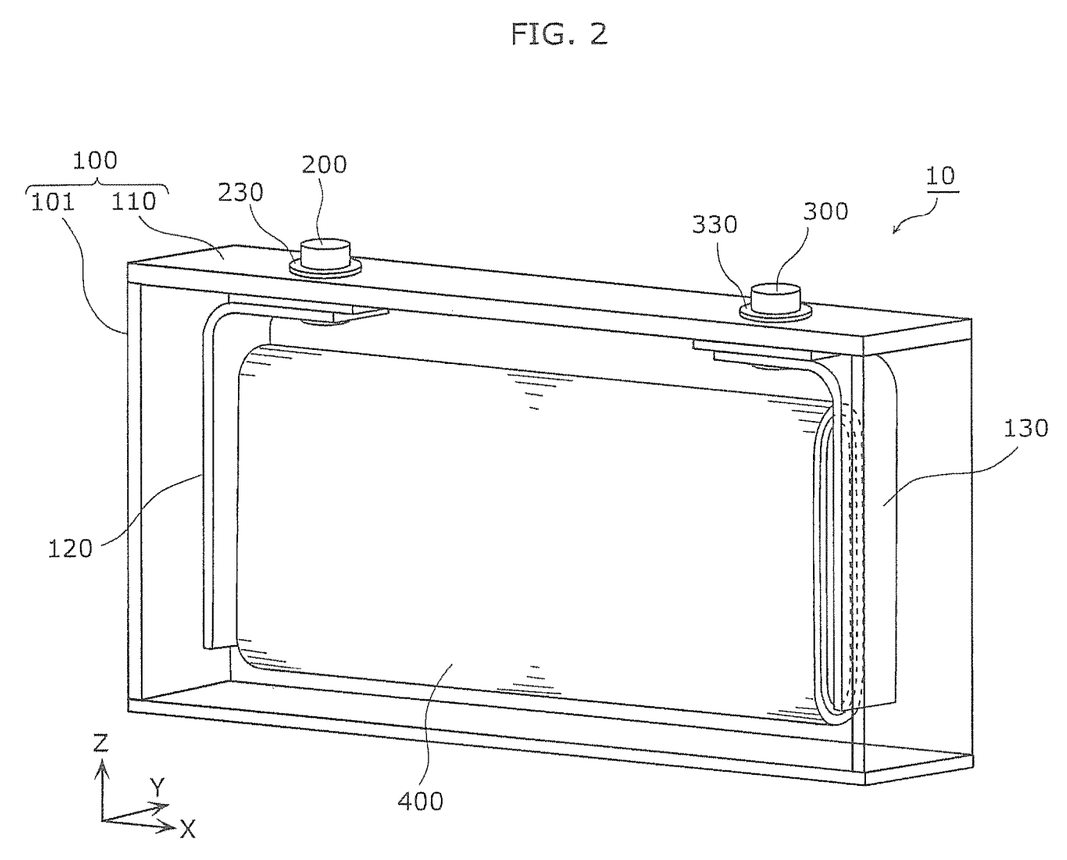
FIG. 2 is a perspective view showing the internal structural design of an energy storage device according to the embodiment.

FIG. 2 is a perspective view showing the internal structural design of an energy storage device 10 according to the embodiment. It should be noted that in FIG. 2, the container 100 is portrayed as being transparent to show the inside thereof.

The energy storage unit 1 includes a plurality of the energy storage devices 10 and a bus bar 150 which electrically connects two the plurality of energy storage devices 10.

In this embodiment, the energy storage unit 1 includes a plurality of the bus bars 150, each of which electrically connects two opposite polarity terminals of two neighboring ones of the plurality of energy storage devices 10, thereby connecting the plurality of energy storage devices 10 in series.

Moreover, the energy storage unit 1 includes an insulating member 160 provided between the container 100 of an energy storage device 10 and the bus bar 150 connected to that energy storage device 10. Variations and such of the positioning and configuration of the insulating member 160 will be described later with reference to FIG. 3 through FIG. 10B.

It should be noted that the energy storage unit 1 is also referred to as a "battery module", for example, since it includes a plurality of energy storage devices. Furthermore, each of the energy storage devices 10 is also referred to as a "cell".

Moreover, the energy storage unit 1 also includes other structural elements not shown in FIG. 1, such as a case which houses the plurality of energy storage devices 10 connected in series. However, in order to clearly describe the characteristics of the energy storage unit 1 according to the embodiment, depictions in the drawings and descriptions for the case and other structural elements are omitted.

Each of the energy storage devices 10 included in the energy storage unit 1 according to the embodiment is a secondary battery capable of charging and discharging electricity, such as a non-aqueous electrolyte secondary battery.

A lithium ion secondary battery in which, for example, the positive electrode active material is a lithium transition metal oxide such as lithium cobalt oxide and the negative electrode active material is a carbon material, is one example of a non-aqueous electrolyte secondary battery.

It should be noted that the energy storage device 10 is not limited to a non-aqueous electrolyte secondary battery. The energy storage device 10 may be a secondary battery other than a non-aqueous electrolyte secondary battery, or a primary battery.

As FIG. 2 shows, the energy storage device 10 includes a container 100 which houses an electrode assembly 400, a positive electrode terminal 200, and a negative electrode terminal 300. The positive electrode terminal 200 and the negative electrode terminal 300 project from the container 100 in the same direction and are electrically connected to the electrode assembly 400.

The container 100 is configured of a rectangular tubular metal container body 101 having a bottom, and a cover plate 110 that is metallic and hermetically seals the opening of the container body 101.

An electrode assembly 400, a positive electrode current collector 120, and a negative electrode current collector 130 are included inside the container 100.

It is to be noted that even though it is not shown in the Drawings, the container 100 of the energy storage device 10 contains a liquid such as an electrolyte.

Moreover, the inside of the container 100 is hermetically sealed after insertion of the electrode assembly 400 and such by, for example, welding the cover plate 110 to the container body 101.

The electrode assembly 400, a component that is capable of storing electricity, includes the positive electrode, the negative electrode, and a separator. Specifically, the electrode assembly 400 is formed by winding into an oblong shape a laminate made of the negative electrode, the positive electrode, and the separator interposed therebetween. Moreover, the positive electrode foil is made of, for example, aluminum, and the negative electrode foil is made of, for example, copper.

It should be noted that the electrode assembly 400 is depicted as being oblong in shape, but the electrode assembly 400 may be circular or elliptical in shape. Moreover, the design of the electrode assembly 400 is not limited to a wound structure, and may be a design in which flat electrode plates are laminated.

The positive electrode terminal 200 is an electrode terminal that is electrically connected to the positive electrode in the electrode assembly 400, and the negative electrode terminal 300 is an electrode terminal that is electrically connected to the negative electrode in the electrode assembly 400.

Moreover, the positive electrode terminal 200 and the negative electrode terminal 300 are attached to the cover plate 110 located above the electrode assembly 400, while being insulated from the cover plate 110.

More specifically, the positive electrode terminal 200 is attached to the cover plate 110 via a packing member 230, and the negative electrode terminal 300 is attached to the cover plate 110 via a packing member 330.

The packing member 230 and the packing member 330 are each formed from an insulating material such as resin.

In other words, the packing members 230 and 330 function to maintain the electric insulation and air tightness between the positive and negative electrode terminals 200 and 300 and the cover plate 110, respectively.

The positive electrode current collector 120 is a rigid component having conductive properties that is electrically connected to the positive electrode terminal 200 and the positive electrode in the electrode assembly 400, and positioned between the positive electrode in the electrode assembly 400 and a side wall of the container 100. It is to be noted that the positive electrode current collector 120 and the positive electrode foil in the electrode assembly 400 alike are made of aluminum.

The negative electrode current collector 130 is a rigid component having conductive properties that is electrically connected to the negative electrode terminal 300 and the negative electrode in the electrode assembly 400, and positioned between the negative electrode in the electrode assembly 400 and a side wall of the container 100. It is to be noted that the negative electrode current collector 130 and the negative electrode foil in the electrode assembly 400 are made of copper.

Various types of electrolytes can be selected for the non-aqueous electrolyte sealed in the container 100.

Examples of organic solvents for the non-aqueous electrolyte include ethylene carbonate, propylene carbonate, butylene carbonate, trifluoropropylene carbonate, γ-butyrolactone, γ-valerolactone, sulfolane, 1,2-dimethoxyethane, 1,2-diethoxyethane, tetrahydrofuran, 2-methyltetrahydrofuran, 2-Methyl-1,3-dioxolane, dioxolane, fluoroethylmethyl ether, ethylene glycol diacetate, propylene glycol diacetate, ethylene glycol dipropionate, propylene glycol dipropionate, methyl acetate, ethyl acetate, propyl acetate, butyl acetate, methyl propionate, ethyl propionate, propyl propionate, dimethyl carbonate, diethyl carbonate, ethyl methyl carbonate, methyl propyl carbonate, ethyl propyl carbonate, dipropyl carbonate, methyl isopropyl carbonate, ethyl isopropyl carbonate, diisopropyl carbonate, dibutyl carbonate, acetonitrile, fluoroacetonitrile, alkoxy- and halogen-substituted cyclic phosphazenes or linear phosphazenes such as ethoxypentafluorocyclotriphosphazene, diethoxytetrafluorocyclotriphosphazene, and phenoxypentafluorocyclotriphosphazene, phosphoric acid esters such as triethyl phosphate, trimethyl phosphate, and trioctyl phosphate, boric acid esters such as triethyl borate and tributyl borate, and non-aqueous solvents such as N-methyloxazolidinone and N-ethyloxazolidinone. Additionally, known additives can be added to these.

When a solid electrolyte is used, a porous polymer solid electrolyte membrane may be used as the polymer solid electrolyte, and the polymer solid electrolyte may further include an electrolyte solution. When a gelatinous polymer solid electrolyte is used, the electrolyte constituting the gel and the electrolyte solution included in the pores, for example, may be different. However, in the case of medium or large sized energy storage device which calls for high output and high capacity, it is preferable that only a non-aqueous electrolyte is used rather than a solid electrolyte or a polymer solid electrolyte.

In this embodiment, the energy storage unit 1 includes, for example, twelve of the energy storage devices 10 having the above configuration. When the electromotive force of one of the energy storage devices 10 is 4.2 V, the electromotive force of the energy storage unit 1 is 50.4 V.

Moreover, eleven of the bus bars 150 are provided in the energy storage unit 1 for serially connecting the twelve energy storage devices 10.

It should be noted that the number of energy storage devices 10 and bus bars 150 given are examples. The energy storage unit 1 may include at least two energy storage devices 10 and one bus bar 150 which connects opposite polarity terminals of the energy storage devices 10.

(Bus Bar and Insulating Member Positioning Example)

The positioning and such of the bus bar 150 and the insulating member 160 in the energy storage unit 1 according to the embodiment having a basic structure like described above will be described using FIG. 3 through FIG. 6A.

Figure 3:
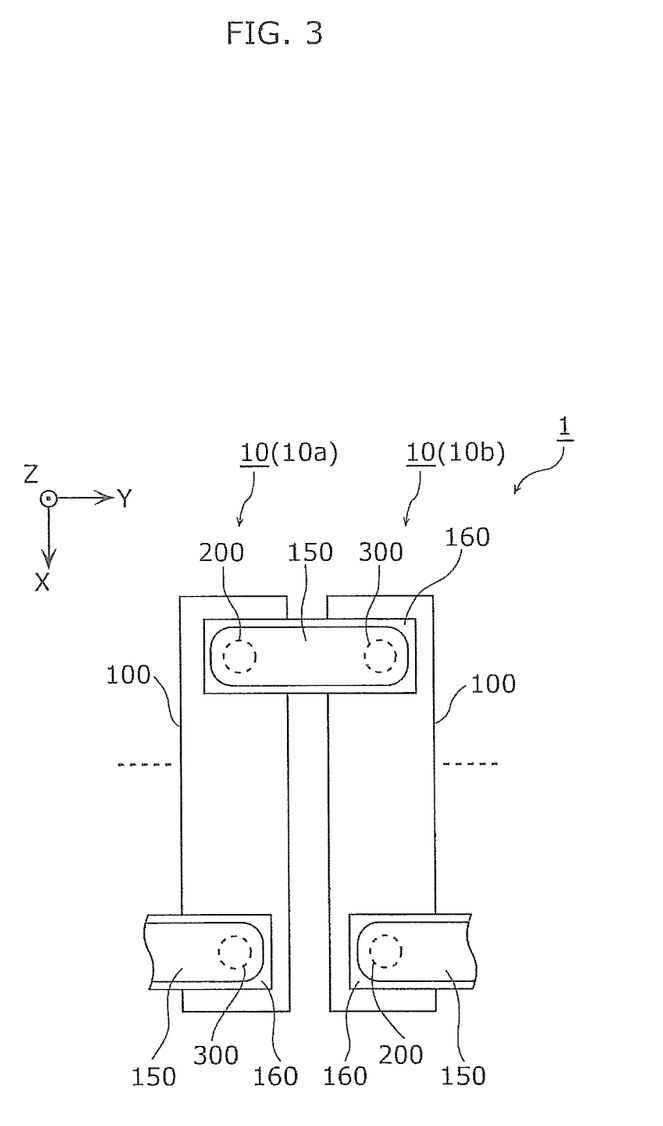
FIG. 3 is a top view showing an example of the positioning of the bus bar and the insulating member according to the embodiment.
Figure 4:
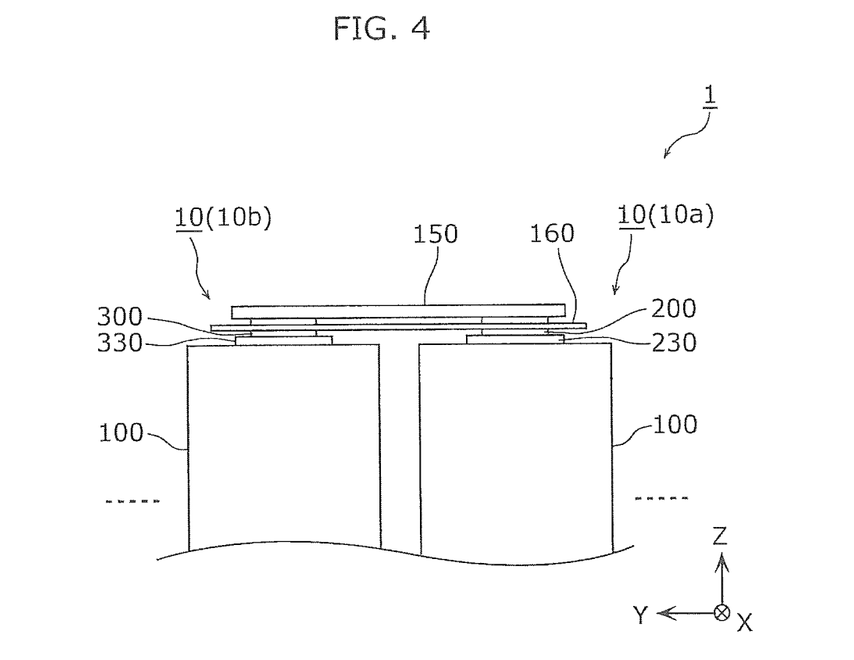
FIG. 4 is a side view corresponding to FIG. 3.

FIG. 3 is a top view of an example of the positioning of the bus bar 150 and the insulating member 160 according to the embodiment, and FIG. 4 is a side view corresponding to FIG. 3.

Figure 5:
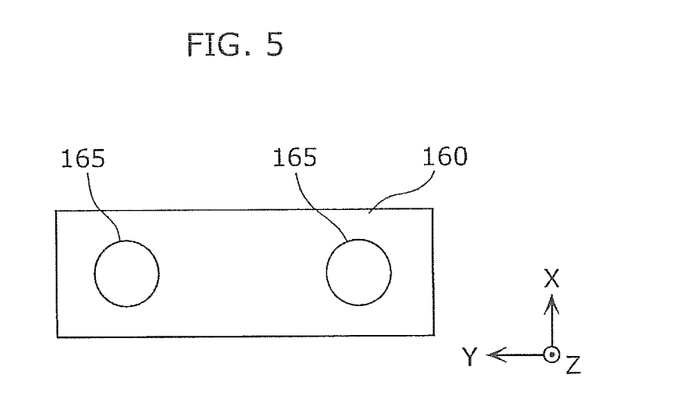
FIG. 5 is a top view showing an example of the shape the insulating member according to the embodiment.

FIG. 5 is a top view showing an example of the shape the insulating member 160 according to the embodiment.

It should be noted that in this embodiment, for the purpose of illustration, the projecting direction (Z axis direction) of the electrode terminal (at least one of the positive electrode terminal 200 and the negative electrode terminal 300; applies hereinafter as well) in the energy storage devices 10 is shown as being vertical, but arrangement of the energy storage unit 1 when installed in, for example, a vehicle is not particularly limited.

Moreover, FIG. 3 and FIG. 4 focus on two of the plurality of energy storage devices 10 and a single bus bar 150 that connects these two energy storage devices 10. As such, explanation will focus on the positioning of the bus bar 150 and the insulating member 160 corresponding to the bus bar 150 shown.

Moreover, to differentiate between these two energy storage devices 10, for the sake of simplicity, one of the two energy storage devices 10 is referred to as a first energy storage device 10a and the other is referred to as a second energy storage device 10b.

The bus bar 150 is a plate or bar shaped conductor made of metal uncoated with an insulation coating, and as FIG. 3 and FIG. 4 show, electrically connects the positive electrode terminal 200 of the first energy storage device 10a and the negative electrode terminal 300 of the second energy storage device 10b.

In other words, opposite polarity terminals of two neighboring energy storage devices 10 are electrically connected by the bus bar 150.

It should be noted that the positive electrode terminal 200 of the first energy storage device 10a is an example of the first terminal, and the negative electrode terminal 300 of the second energy storage device 10b is an example of the second terminal.

Moreover, in the embodiment, the bus bar 150 and the electrode terminal are bonded together by welding, but a method other than welding may be used.

For example, the electrode terminal and the bus bar 150 may be fastened with a bolt or a rivet.

Here, regarding the positive electrode terminal 200, a packing member 230 is provided between the positive electrode terminal 200 and the container 100 of the first energy storage device 10a, and the insulating member 160 is provided between the bus bar 150 and the container 100 of the first energy storage device 10a. In this configuration, the packing member 230 is one example of the first insulating member, and the insulating member 160 is one example of the second insulating member.

Moreover, in this embodiment, as FIG. 3 and FIG. 4 show, a single insulating member 160 is provided between the bus bar 150 and the containers 100 of the first energy storage device 10a and the second energy storage device 10b.

Moreover, the bus bar 150 is electrically connected to the first terminal (the positive electrode terminal 200 of the first energy storage device 10a) and the second terminal (the negative electrode terminal 300 of the second energy storage device 10b) through two holes 165 (see FIG. 5) provided in the insulating member 160.

Furthermore, as FIG. 3 shows, when viewed from above, the insulating member 160 is larger than the bus bar 150. As a result, even if an outside force were to act upon the energy storage unit 1 and cause at least one of the first energy storage device 10a and the second energy storage device 10b to lean, the bus bar 150 would be kept from directly contacting the container 100 of the first energy storage device 10a and the container 100 of the second energy storage device 10b.

In other words, for example, even in the event of a crash, between an apparatus in which the energy storage unit 1 is installed and another object, which deforms the energy storage unit 1 thereby putting it in an abnormal state, the bus bar 150 and the container 100 of the energy storage device 10 are kept from electrically shorting.

As a result, abnormal occurrences, such as generation of heat from an electrical short between the bus bar 150 and the container 100 of the energy storage device 10 and generation of smoke from contact between the heated area and the electrolyte, can be reduced.

Next, the material and such used in the insulating member 160 providing this sort of advantageous effect will be described.

(Insulating Member Material and Such)

Figure 6A:
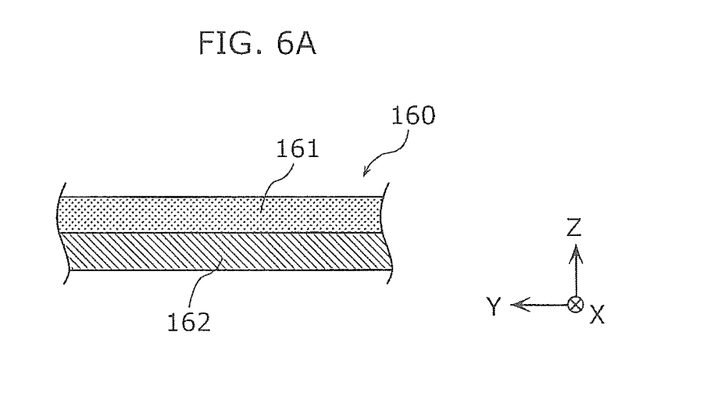
FIG. 6A is a cross-sectional view showing an example of the configuration of the insulating member according to the embodiment.

FIG. 6A is a cross-sectional view showing an example of the configuration of the insulating member 160 according to the embodiment.

The insulating member 160 according to the embodiment is formed from, layered in the thickness direction (direction in which the electrode terminal passes through the insulating member 160), a resin layer 162 including a resin and a ceramic layer 161 including a ceramic.

The resin layer 162 is a sheet-like member formed from a high temperature fiber (having, for example, a melting point of 200° C. or higher) made from, for example, resin. Examples of materials used for the high temperature fiber include nylon, aramid, polyacrylate, polyvinyl alcohol (PVA), polyphenylene sulfide (PPS), polyether ether ketone (PEEK), polyimide, and fluorocarbon polymers.

Moreover, as the material used for the resin layer 162, a fiber having a melting point less than 200° C. (for example, polyethylene (PE) or polypropylene (PP)) may be used.

Moreover, the resin layer 162 can be formed from a composite material of carbon fiber, which is a high temperature fiber, and a resin having high heat resistance properties.

The ceramic layer 161 is a sheet-like member made by mixing, for example, ceramic particles and a binder such as epoxy resin.

Examples of the ceramic included in the ceramic layer 161 include oxide ceramics such as alumina, silica, titania, zirconia, magnesia, ceria, yttria, zinc oxide and iron oxide, and nitride ceramics such as silicon nitride, titanium nitride, and boron nitride.

Moreover, other examples of the ceramic included in the ceramic layer 161 include silicon carbide, calcium carbonate, aluminum sulfate, aluminum hydroxide, potassium titanate, talc, kaolin clay, kaolinite, halloysite, pyrophyllite, montmorillonite, sericite, mica, amesite, bentonite, zeolite, calcium silicate, magnesium silicate, diatomite, and silicate sand.

It should be noted that the thickness of the insulating member 160 is, for example, preferably between 1 μm and 3000 μm, and more preferably between 100 μm and 1000 μm.

Moreover, the insulating member 160 is, for example, formed by coating a composite of ceramic particles and a binder on the surface of the resin layer 162.

Moreover, by cutting the sheets of the layered resin layer 162 and ceramic layer 161, it is possible to obtain a desired size and shape of the insulating member 160.

Since the insulating member 160 according to the embodiment is formed from the resin layer 162 and the ceramic layer 161 in this manner, it has insulating properties as well as heat resistance properties and is flexible and durable.

For this reason, even if, for example, the insulating member 160 were to become firmly stuck between the bus bar 150 and the container 100 of an energy storage device 10 due to a great outside force being applied to the energy storage unit 1, for example, since the insulating member 160 is resistant to breaking, the insulating function of the insulating member 160 would be maintained. In other words, the bus bar 150 and the container 100 of the energy storage device 10 are kept from electrically shorting.

Moreover, since the insulating member 160 includes ceramic particles, even if the electrolyte solution in the energy storage device 10 were to leak from the container 100, the ceramic particles have the advantageous effect of trapping the acid from hydrolysis of the electrolyte in the electrolyte solution.

Moreover, for example, by using a water-repellent resin as the resin included in the resin layer 162, it is possible to inhibit the formation of condensation on the surface of the resin layer 162.

The insulating member 160 is, overall, a sheet-like thin member. As such, even if the length that the electrode terminal projects from the container 100 is only approximately a few millimeters, it is possible to provide the insulating member 160 between the bus bar 150 and the container 100. In other words, provision of the insulating member 160 allows for a more compact and stable energy storage unit 1.

Moreover, by providing the energy storage unit 1 with the insulating member 160, for example, it is possible to use a relatively thin and light-weight case for the energy storage unit 1. This is advantageous from the perspective of making the energy storage unit 1 more compact and light weight.

Achieving this compact, light-weight, and stable energy storage unit 1 means it is possible to place the energy storage unit 1, for example, under the hood of a vehicle, where energy from the impact during a collision is easily absorbed. The energy storage unit 1 having this characteristic is also applicable as a power source in, for example, portable mobility vehicles.

(Supplemental Information for Embodiment)

A variety of configurations other than the one shown in FIG. 6A can be used for the insulating member 160. For example, the insulating member 160 may be configured of only, for example, the resin layer 162. Moreover, for example, the insulating member 160 may be configured of only a ceramic layer 161 which uses a ceramic with insulating properties.

Moreover, for example, as the configuration of the insulating member 160, a configuration in which the resin layer 162 is sandwiched between two ceramic layers 161 may be used, and a configuration which includes four or more layers including the resin layer 162 and the ceramic layer 161 may be used.

Furthermore, the ceramic layer 161 and the resin layer 162 may each have different substance compositions (ceramic or resin). A configuration in which the ceramic is dispersed in the resin layer 162 is also acceptable. It should be noted that mechanical strength is necessary for preventing an electrical short in the event of a collision, for example, and it is preferable that the insulating member 160 be heat resistant taking into account the environment that the energy storage device 1 is place in and the possibility of damage to the energy storage device 1. It is also preferable that the insulating member 160 be capable of remaining between the bus bar 150 and the container 100 even in the event of deformation.

More specifically, it is preferable that the insulating member 160 include a heat resistant component having a melting point of at least 200° C. (heat resistant resin, ceramic (in the form of a sheet or particles), carbon fiber, fiberglass, etc.). In other words, the insulating member 160 may be configured of only, for example, a heat resistant resin having a melting point of 200° C. or higher.

Moreover, conceivable combinations of materials making the insulating member 160 include any combination of at least two of the following: heat resistant resin, non-heat resistant resin, carbon fiber, ceramic inclusive resin, and ceramic in the form a sheet.

Here, in the embodiment, the insulating member 160 is formed from layers of mutually different materials, as FIG. 6A shows. However, the insulating member 160 may be configured to include one of the mutually different materials dispersed in the other.

Figure 6B:
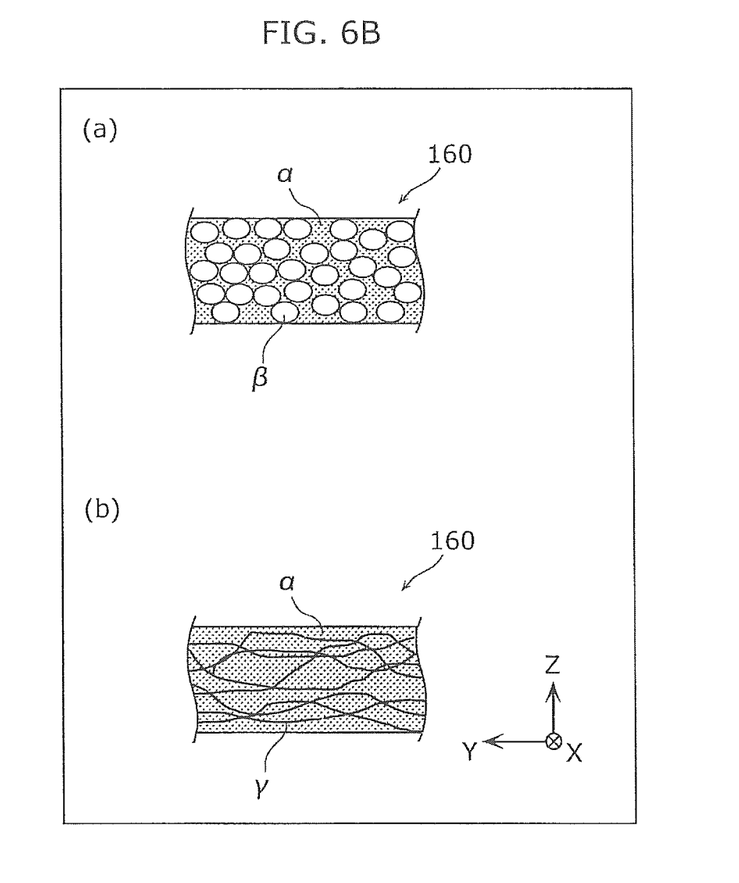
FIG. 6B is a cross-sectional view showing a different configuration example of the insulating member.

FIG. 6B is a cross-sectional view showing a different configuration example of the insulating member 160.

As (a) in FIG. 6B shows, the insulating member 160 may be configured such that a heat resistant component β in particle form is dispersed in a heat resistant component or a non-heat resistant component α.

Alternatively, as (b) in FIG. 6B shows, the insulating member 160 may be configured such that a fibrous heat resistant component γ is dispersed in a heat resistant component or a non-heat resistant component α.

It should be noted that examples of the heat resistant components used for α, β, or γ include various ceramics in sheet or particle form, carbon fiber, fiberglass, and heat resistant resin.

Moreover, examples of the heat resistant resin include, in addition to the above-described PVA, PPS, PEEK, polyimide etc., the following substances: polyethylene terephthalate (PET), polybutylene terephthalate (PBT), polyethylenimine (PEI), polyphenylsulfone (PPSU), polyamide-imide (PAI), polyethersulfone (PES), polysulfone (PSF), polyarylate (PAR), liquid-crystal polymer (LCP), melamine resin (MF), phenolic resin (PF), silicon resin (SI), and epoxy resin (EP).

Examples of fluorocarbon polymers, which are one type of heat resistant resin, include polytetrafluoroethylene (PTFE), tetrafluoroethylene-hexafluoropropylene copolymer (FEP), tetrafluoroethylene-ethylene copolymer (ETFE), tetrafluoroethylene-perfluoroalkyl vinyl ether (FEP), and polychlorotrifluoroethene (PCTFE).

Examples of the non-heat resistance component used as a include, in addition to PE and PP listed above, polystyrene, ABS resin, polyvinyl, methacrylic resin, celluloses and rubbers.

In the embodiment, the insulating member 160 is shaped and sized to cover the surrounding area of the positive electrode terminal 200 of one of two neighboring energy storage devices 10 and the negative electrode terminal 300 of the other of the two neighboring energy storage devices 10 (for example, see FIG. 3).

In other words, the insulating member 160 is shaped and sized to cover predetermined regions of two energy storage devices 10 in which contact with a single bus bar 150 is possible.

However, the insulating member 160 may be shaped and sized to cover the area surrounding the positive electrode terminal 200 and the negative electrode terminal 300 of a single energy storage device 10 in which contact with two bus bars 150 is possible.

In other words, the insulating member 160 may be provided with two holes, and the positive electrode terminal 200 of one energy storage device 10 may be electrically connected to a bus bar 150 through one of the two holes, and the negative electrode terminal 300 of the same energy storage device 10 may be electrically connected to a different bus bar 150 through the other of the two holes.

In other words, a single insulating member 160 may have two holes through which the two electrode terminals of a single energy storage device 10 pass, and may be arranged to cover roughly the entire top surface of the container 100 of the energy storage device 10.

In this case, it is possible to attach an insulating member 160 designed to correspond to the two electrode terminals of a single energy storage device 10 to each of the plurality of energy storage devices 10 to be included in the energy storage unit 1, before fitting together the energy storage devices 10.

Moreover, it is not necessary to provide the insulating member 160 for a plurality of electrode terminals; the insulating member 160 may be shaped and sized to cover a predetermine region on a single energy storage device 10 in which contact with one bus bar 150 is possible.

Figure 7:
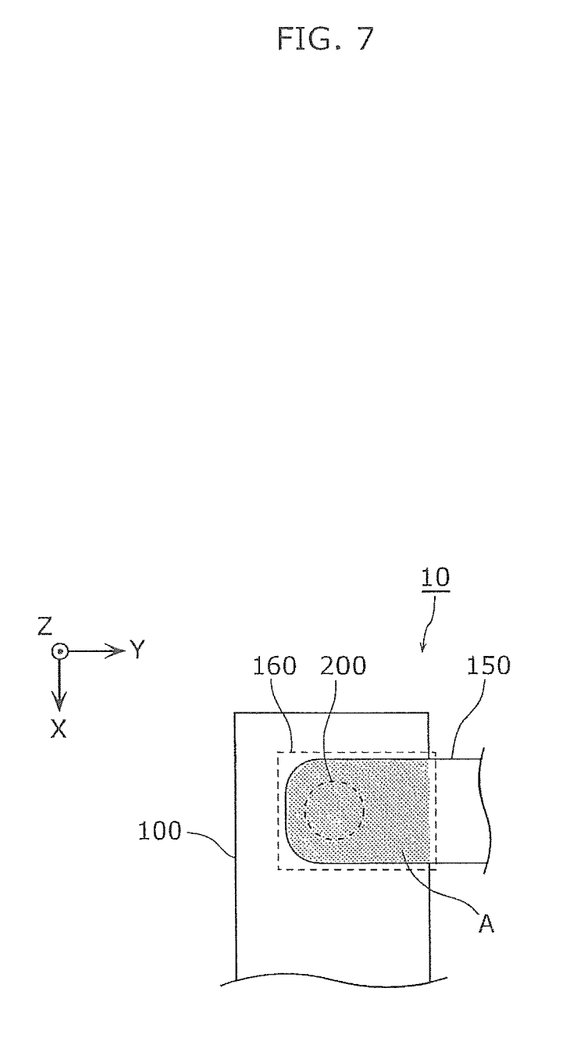
FIG. 7 shows an example of the area covered by a single insulating member.

FIG. 7 shows an example of the area A covered by a single insulating member 160. It should be noted that in FIG. 7, the outline of the insulating member 160 is drawn with a dashed line, and the area A is colored in with dots.

When viewing the energy storage device 10 from a side on which the bus bar 150 is provided, the insulating member 160 shown in FIG. 7 is positioned to cover at least the area A in which the bus bar 150 and a surface of the container 100 of the energy storage device 10 from which an electrode terminal (in FIG. 7, the positive electrode terminal 200) extends overlap.

More specifically, the insulating member 160 sized and shaped to include the area A when viewed from above is positioned above the area A and below the bus bar 150.

In this way, by arranging the insulating member 160 to cover a region of the container 100 of the energy storage device 10 in which the bus bar 150 is highly likely to electrically short, this electrical shorting can be more reliably kept from occurring.

In other words, the insulating member 160 may be provided for only one of the two electrode terminals of a single energy storage device 10.

For example, consider a case in which the positive electrode terminal 200 is insulated from the container 100 and the negative electrode terminal 300 is not insulated from the container 100 in the energy storage device 10—that is to say, a case in which the container 100 and the negative electrode terminal 300 have the same electric potential.

In this case, if the insulating member 160 is arranged corresponding to the positive electrode terminal 200, as FIG. 7 shows, the bus bar 150 and the container 100 in FIG. 7 can be kept from electrically shorting, which causes heat generation and such.

Moreover, a single insulating member 160 may be provided with respect to three or more electrode terminals.

Figure 8A:
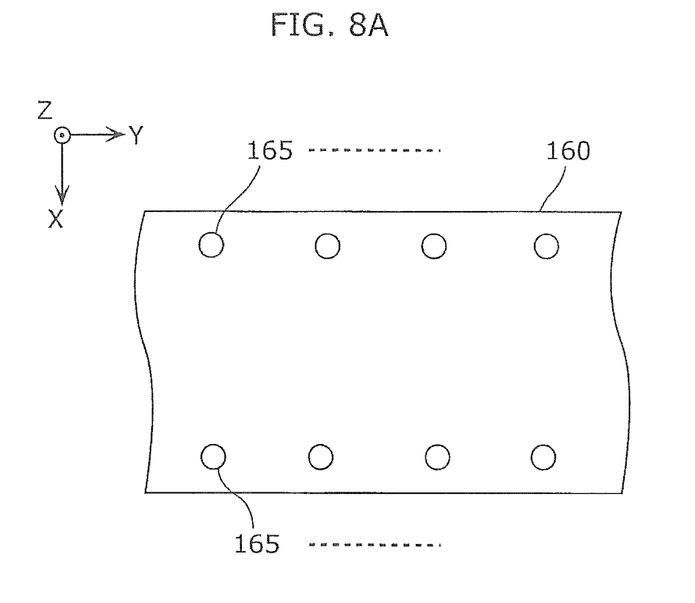
FIG. 8A shows an example of the shape of an insulating member designed to be used with three or more electrode terminals.

FIG. 8A shows an example of the shape of the insulating member 160 designed to be used with three or more electrode terminals.

Figure 8B:
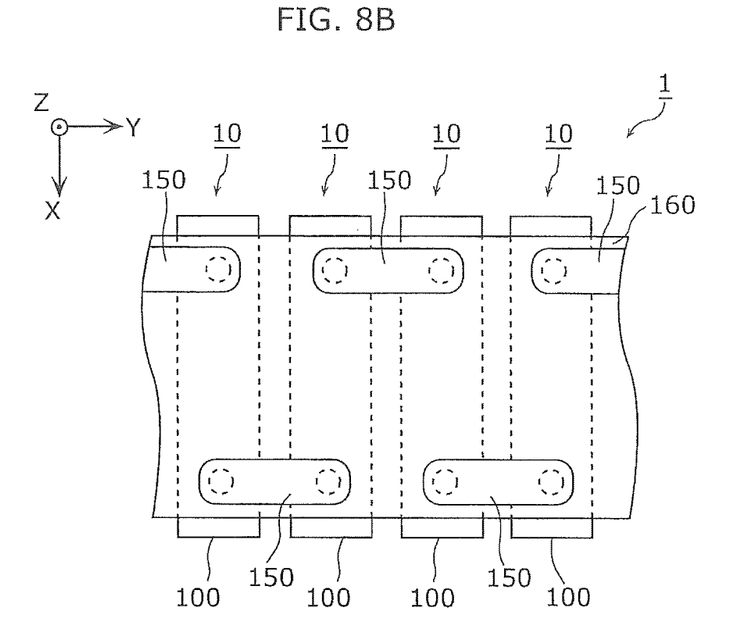
FIG. 8B is a top view showing the structural design of the energy storage unit provided with the insulating member shown in FIG. 8A.

FIG. 8B is a top view showing the structural design of the energy storage unit 1 provided with the insulating member shown 160 in FIG. 8A.

For example, as FIG. 8A shows, an insulating member 160 approximately sized to cover the positive electrode terminals 200 and the negative electrode terminals 300 of the plurality of energy storage devices 10 included in the energy storage unit 1 is provided with holes 165 through which the electrode terminals fit.

With this, as FIG. 8B shows, a large portion of the containers 100 of the plurality of energy storage devices 10 included in the energy storage unit 1 is covered by a single insulating member 160.

As a result, across a plurality of electrode terminals, insulation between the bus bars 150 and the containers 100 of the energy storage devices 10 can be more reliably ensured due to the single insulating member 160.

Moreover, for example, it is possible to greatly increase production efficiency of the energy storage unit 1 beyond that of when an insulating member 160 is provided per electrode terminal.

It should be noted that the shape and size of the insulating member 160 shown in FIG. 8A is merely an example. The insulating member 160 designed for three or more electrode terminals may be shaped and sized differently than the example shown in FIG. 8A.

Figure 9:
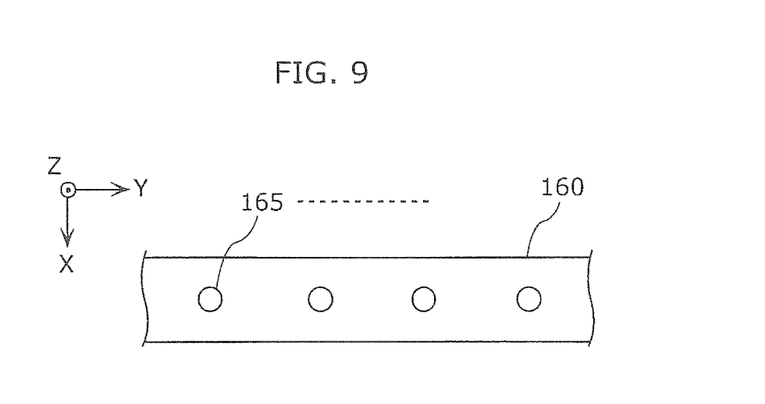
FIG. 9 shows a different example of the shape of an insulating member designed to be used with three or more electrode terminals.

For example, the insulating member 160 may include only one row of the holes 165 spaced according to the distance between the energy storage devices 10, as FIG. 9 shows.

When, for example, the energy storage unit 1 includes twelve of the energy storage devices 10, an insulating member 160 is provided which has twelve holes for the positive electrode terminals 200 and the negative electrode terminals 300 of the energy storage devices 10 to pass through. With this, the bus bars 150 and the containers 100 of the energy storage devices 10 at one of the positive electrode side and the negative electrode side of each energy storage device 10 are kept from electrically shorting.

Moreover, by providing two of the insulating members 160 shown in FIG. 9, the bus bars 150 and the containers 100 of the energy storage devices 10 at both the positive electrode side and the negative electrode side of each energy storage device 10 are kept from shorting.

Moreover, in the embodiment, the first insulating member (the packing member 230 and 330) which insulates the electrode terminal from the container 100 and the second insulating member (the insulating member 160) provided to insulate the bus bar 150 from the container 100 are provided as separate members.

However, the first insulating member and the second insulating member may be integrated as a single member. For example, regarding the positive electrode terminal 200, the packing member 230 may be formed to have a size and shape to cover the area A (see FIG. 7). With this, it is possible to obtain a packing member 231 which has the functions of both the first insulating member and the second insulating member.

Figure 10A:
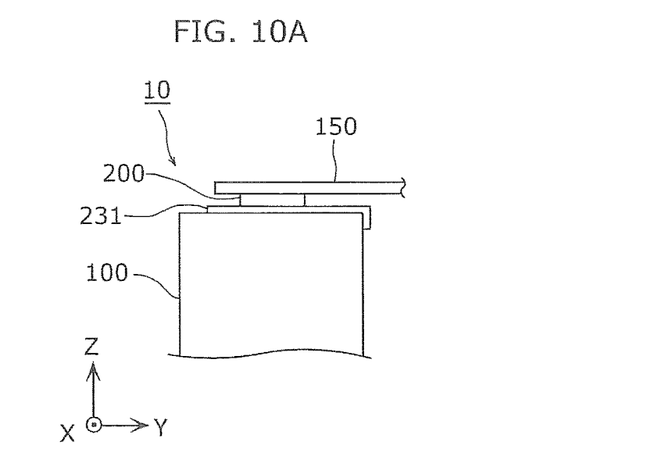
FIG. 10A is a side view showing an example of the shape of a packing member functioning as a first insulating member and a second insulating member.

FIG. 10A is a side view showing an example of the shape of the packing member 231 functioning as the first insulating member and the second insulating member.

Figure 10B:
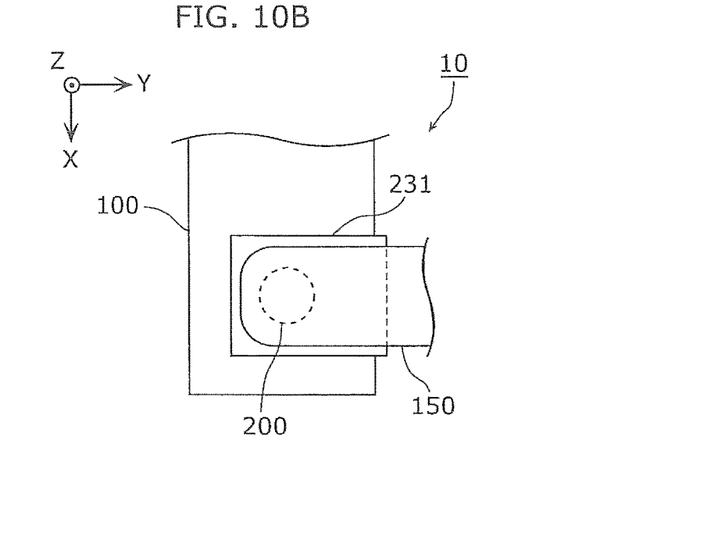
FIG. 10B is a top view corresponding to FIG. 10A.

FIG. 10B is a top view corresponding to FIG. 10A.

By being placed between the positive electrode terminal 200 and the container 100, the packing member 231 shown in FIG. 10A and FIG. 10B functions to maintain the insulation and air tightness between the positive electrode terminal 200 and the container 100.

Moreover, the packing member 231 extends in the extending direction of the bus bar 150 (the y axis direction) so as to cover the top surface (top surface of the cover plate 110; see FIG. 2) of the container 100 beyond the end edge of the bus bar 150.

As a result, the packing member 231 also functions to prevent electrical shorting between the bus bar 150 and the container 100.

In other words, in the energy storage unit 1, the packing member 231 can function as a single member of the first insulating member and the second insulating member integrated as one.

As such, compared to when the first insulating member and the second insulating member are separate members, for example, the number of components included in the energy storage unit energy storage unit decreases, thereby increasing the production efficiency of the energy storage unit 1.

Moreover, for example, a configuration may be used in which the bus bar and the second insulating member (the bus bar 150 and the insulating member 160 in the embodiment) are combined.

Moreover, the bus bar 150 and an electrode terminal may be electrically connected by coupling the bus bar 150 and an electrode terminal via a different member, rather than directly coupling the bus bar 150 and an electrode terminal.

Figure 11A:
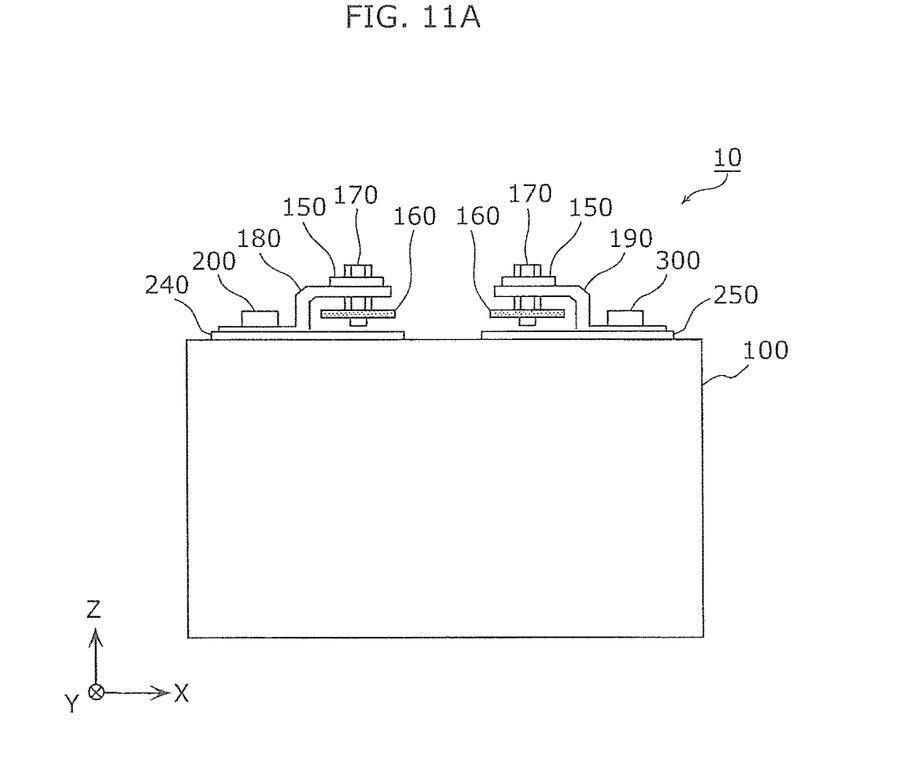
FIG. 11A is a side view showing a different example of the connection configuration of the bus bar and the energy storage device.

FIG. 11A is a side view showing a different example of the connection configuration of the bus bar 150 and the energy storage device 10.

Figure 11B:
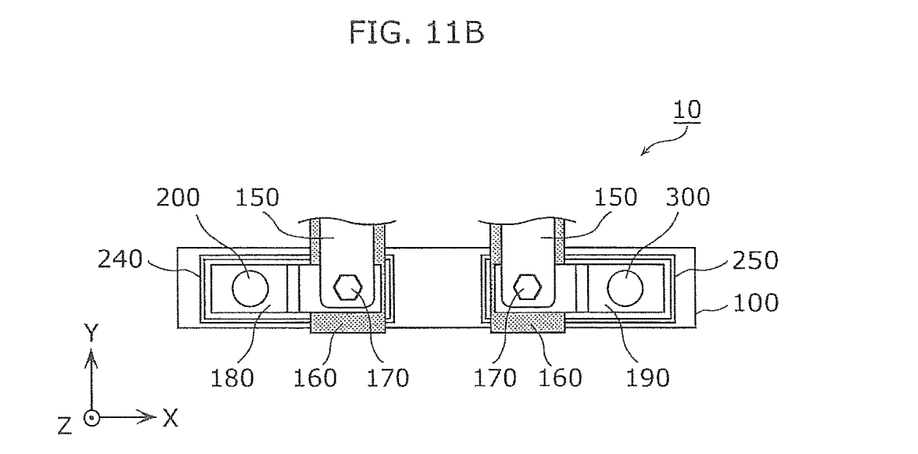
FIG. 11B is a top view corresponding to FIG. 11A.

FIG. 11B is a top view corresponding to FIG. 11A.

On the energy storage device 10 shown in FIG. 11A, a conductive member 180 attached to the negative electrode terminal 200 is provide above a base member 240, which has insulating properties and is provided on the top surface of the container 100.

Moreover, the bus bar 150 is attached with a bolt to the end of the conductive member 180 opposite the end corresponding to the negative electrode terminal 200.

Moreover, the positive electrode side has the same structure. More specifically, a conductive member 190 attached to the positive electrode terminal 300 is provided above a base member 250. Moreover, the bus bar 150 is attached with a bolt to the end of the conductive member 190 opposite the end corresponding to the positive electrode terminal 300.

In the energy storage device 10 having the bus bar 150 connected thereto with this kind of configuration, an insulating member 160 is further provided between the bus bar 150 and the container 100 of the energy storage device 10.

More specifically, the insulating member 160 is provided to cover at least an area in which the bus bar 150 and a surface of the container 100 of the energy storage device 10 from which the electrode terminals extend overlap.

In this way, it is possible to arrange the insulating member 160 to cover a region of the container 100 of the energy storage device 10 in which the bus bar 150 is highly likely to electrically short, even when the bus bar 150 and an electrode terminal are electrically connected via a conductive member (180 or 190).

As a result, this sort of electrical shorting can be prevented with greater reliability.

Moreover, by using the conductive member (180 or 190) for the connection of the bus bar 150 and the electrode terminal, it is possible to prevent the torque from fastening the bolt 170 from extending to the electrode terminal when attaching the bus bar 150. For this reason, when the bus bar 150 is attached to the energy storage device 10 by the bolt 170, for example, it is possible to prevent the electrode terminal from rotating.

It should be noted that the arrangement of the insulating member 160 shown in FIG. 11A and FIG. 11B is merely an example. For example, the insulating member 160 may be attached to the energy storage device 10 by a projection provided in the base member (240 or 250) which fits through the insulating member 160.

Hereinbefore, the energy storage unit according to an aspect of the present invention has been described based on the exemplary embodiment and the supplemental information, but the scope of the present invention is not intended to be limited thereto. Various modifications of the exemplary embodiment and the supplemental information as well as embodiments resulting from arbitrary combinations of constituent elements of different exemplary embodiments that may be conceived by those skilled in the art are intended to be included within the scope of the present invention as long as these do not depart from the essence of the present invention.

The invention claimed is:

1. An energy storage unit including a plurality of energy storage devices, each of which includes (i) a container which houses an electrode assembly and (ii) a positive electrode terminal and a negative electrode terminal which are electrically connected to the electrode assembly and extend from the container in a same direction, the energy storage unit comprising:
    a bus bar which electrically connects a first terminal and a second terminal, the first terminal being one of the positive electrode terminal and the negative electrode terminal of a first energy storage device included in the plurality of energy storage devices, the second terminal being one of the positive electrode terminal and the negative electrode terminal of a second energy storage device included in the plurality of energy storage devices and opposite in polarity to the first terminal;
    a first insulating member interposed between the first terminal and the container of the first energy storage device; and
    a second insulating member interposed between the bus bar and the container of the first energy storage device,
    wherein a length of the second insulating member, in a longitudinal direction of the second insulating member, is more than a width of the second insulating member in a width direction of the second insulating member,
    wherein the longitudinal direction of the second insulating member is the same as a longitudinal direction of the bus bar,
    wherein, in the longitudinal direction of the second insulating member, outer edges of the second insulating member end before reaching outer edges of the first energy storage device and the second energy storage device, and
    wherein, in a cross-sectional view, at least one of the first terminal and the second terminal extends to be exposed between the second insulating member and the bus bar to space apart the second insulating member from the bus bar in a direction in which the negative electrode terminal and the positive electrode terminal protrude from the container.

2. The energy storage unit according to claim 1, wherein, when viewing the first energy storage device from a side on which the bus bar is provided, the second insulating member covers at least an area in which the bus bar and a surface of the container of the first energy storage device from which the first terminal extends overlap.

3. The energy storage unit according to claim 1, wherein the second insulating member is provided with two holes and is interposed between the bus bar and the container of the first energy storage device and the container of the second energy storage device, and
    wherein the bus bar is electrically connected to the first terminal and the second terminal through the two holes provided in the second insulating member.

4. The energy storage unit according to claim 1, wherein the second insulating member is provided with two holes, the first terminal is electrically connected to the bus bar through a first of the two holes, and one of the positive electrode terminal and the negative electrode terminal of the first energy storage device that is opposite in polarity to the first terminal is electrically connected to a different bus bar through a second of the two holes.

5. The energy storage unit according to claim 1, wherein the second insulating member includes, layered in a thickness direction, a resin layer including a resin and a ceramic layer including a ceramic.

6. The energy storage unit according to claim 1, wherein the first insulating member and the second insulating member are integrated as a single member.

7. An energy storage unit including a plurality of energy storage devices, each of which includes (i) a container which houses an electrode assembly and (ii) a positive electrode terminal and a negative electrode terminal which are electrically connected to the electrode assembly, the energy storage unit comprising:
    a bus bar which electrically connects a first terminal and a second terminal, the first terminal being one of the positive electrode terminal and the negative electrode terminal of a first energy storage device included in the plurality of energy storage devices, the second terminal being one of the positive electrode terminal and the negative electrode terminal of a second energy storage device included in the plurality of energy storage devices; and
    an insulating member for electrically insulating the bus bar from the container of the first energy storage device, the container of the first energy storage device being electrically insulated from the first terminal,
    wherein a length of the insulating member, in a longitudinal direction of an extension of the insulating member, is more than a width of the insulating member in a width direction of an extension of the insulating member,
    wherein the longitudinal direction of the extension of the insulating member is the same as a longitudinal direction of an extension of the bus bar,
    wherein, in the longitudinal direction of the extension of the insulating member, outer edges of the insulating member end before reaching outer edges of the first energy storage device and the second energy storage device, and
    wherein, in a cross-sectional view, at least one of the first terminal and the second terminal extends to be exposed between the insulating member and the bus bar to space apart the insulating member from the bus bar in a direction in which the negative electrode terminal and the positive electrode terminal protrude from the container.

8. An energy storage unit including a plurality of energy storage devices, each of which includes (i) a container which houses an electrode assembly and (ii) a positive electrode terminal and a negative electrode terminal which are electrically connected to the electrode assembly and extend from the container in a same direction, the energy storage unit comprising:
    a bus bar which electrically connects a first terminal and a second terminal, the first terminal being one of the positive electrode terminal and the negative electrode terminal of a first energy storage device included in the plurality of energy storage devices, the second terminal being one of the positive electrode terminal and the negative electrode terminal of a second energy storage device included in the plurality of energy storage devices and opposite in polarity to the first terminal;

a first insulating member interposed between the first terminal and the container of the first energy storage device; and a second insulating member interposed between the bus bar and the container of the first energy storage device, wherein, in a plan view from a top surface of the first energy storage device on which the bus bar is provided, a perimeter of the second insulating member is entirely exposed from a perimeter of the bus bar, and wherein, in a longitudinal direction of the second insulating member, outer edges of the second insulating member end before reaching outer edges of the first energy storage device and the second energy storage device, and wherein, in a cross-sectional view, at least one of the first terminal and the second terminal extends to be exposed between the second insulating member ad the bus bar to space apart the second insulating member from the bus bar in a direction in which the negative electrode terminal and the positive electrode terminal protrude from the container.

9. The energy storage unit according to claim 1, wherein, in a plan view from a top surface of the first energy storage device on which the bus bar is provided, a perimeter of the second insulating member is entirely exposed from a perimeter of the bus bar.

10. The energy storage unit according to claim 1, wherein the second insulating member is configured to be detached from to the bus bar.

11. The energy storage unit according to claim 1, wherein, in the longitudinal direction of the second insulating member, the second insulating member extends from the first terminal to the second terminal.

12. The energy storage unit according to claim 1, wherein, in a plan view from a top surface of the first energy storage device on which the bus bar is provided, an entirety of the bus bar is located inside the second insulating member.

13. The energy storage unit according to claim 1, wherein the first terminal and the second terminal further extend between the second insulating member and the first insulating member to separate the second insulating member from the first insulating member.

14. The energy storage unit according to claim 8, wherein the first terminal and the second terminal extend between the second insulating member and the bus bar to separate the second insulating member from the bus bar.

15. The energy storage unit according to claim 8, wherein the first terminal and the second terminal extend between the second insulating member and the first insulating member to separate the second insulating member from the first insulating member.

16. The energy storage unit according to claim 8, wherein, in the longitudinal direction of the second insulating member, the second insulating member extends from the first terminal to the second terminal.

17. The energy storage unit according to claim 7, wherein, in a plan view from a top surface of the first energy storage device on which the bus bar is provided, an entirety of the bus bar is located inside the insulating member.

18. The energy storage unit according to claim 7, wherein the first terminal and the second terminal extend between the insulating member and the bus bar to separate the insulating member from the bus bar.

* * * * *